March 12, 1957

D. McDONALD 2,785,059

SOLVENT EXTRACTION OF SULPHUR

Filed Feb. 26, 1953

INVENTOR.
Dan McDonald,
BY
Brown, Jackson, Boettcher & Dienner
Attys

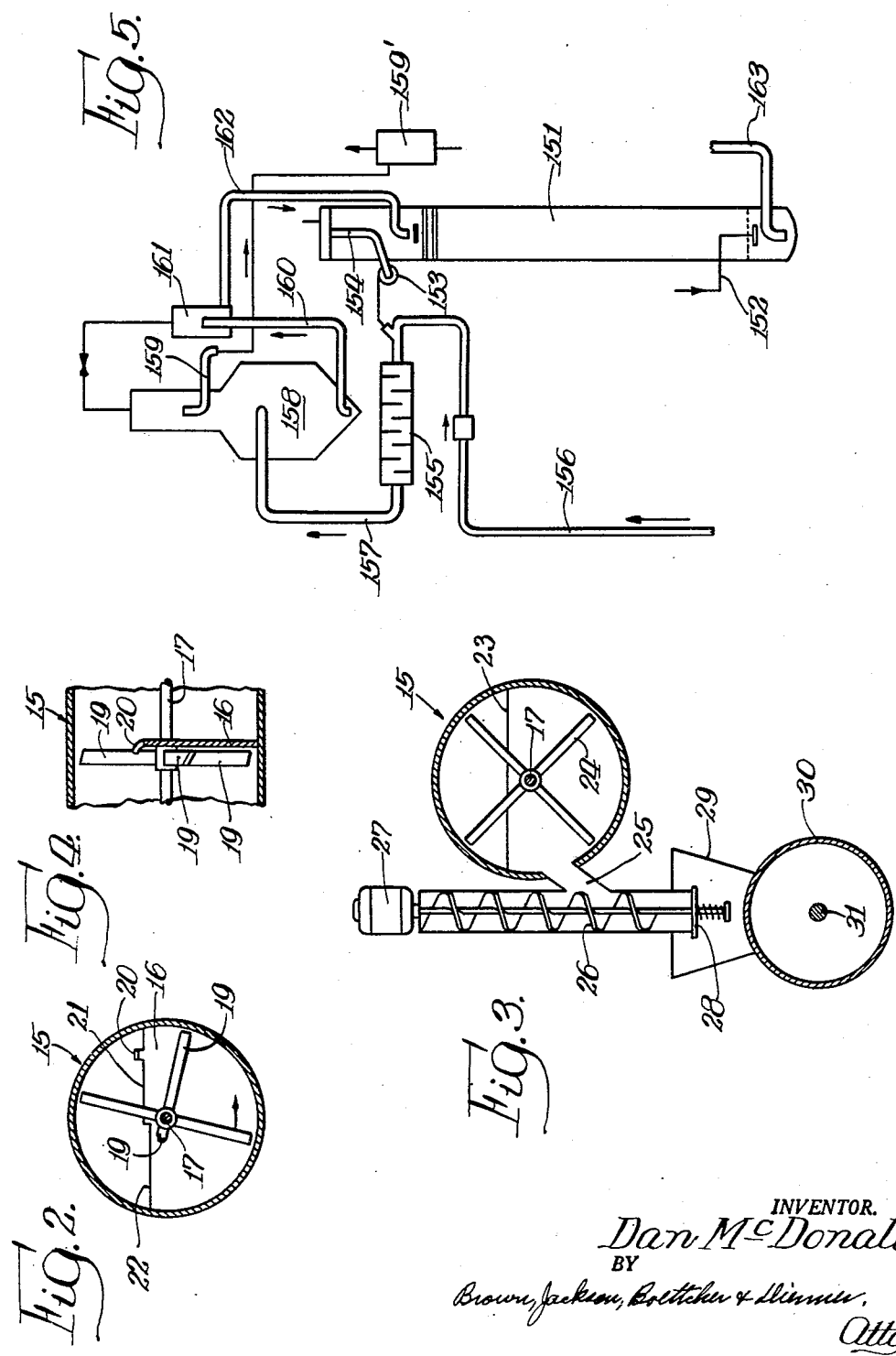

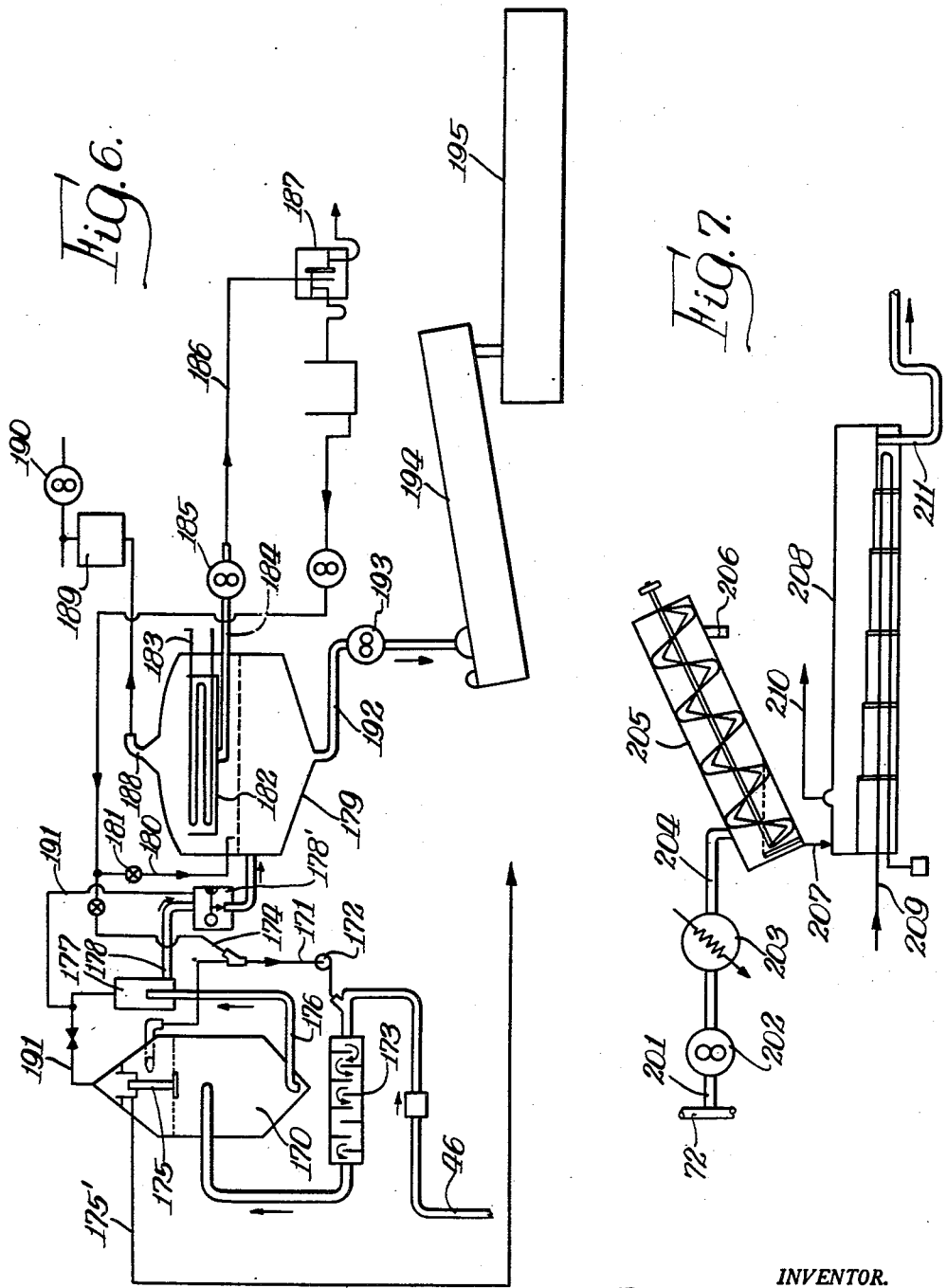

United States Patent Office 2,785,059
Patented Mar. 12, 1957

2,785,059

SOLVENT EXTRACTION OF SULPHUR

Dan McDonald, Aurora, Ill., assignor to American Sulphur & Refining Company, Beverly Hills, Calif., a corporation of Nevada Application February 26, 1953, Serial No. 339,035

10 Claims. (Cl. 23—310)

This invention relates to improvements in the solvent extraction of sulphur from sulphur-bearing ores or materials.

Solvent extraction of sulphur from ores has been known heretofore, as is evidenced by my prior U. S. Patents 2,234,269, issued March 11, 1941, and 2,316,673, issued April 13, 1943.

The general object of the present invention is to provide methods and means especially well adapted for the solvent extraction of a high yield of high purity sulphur from sulphur bearing ores which heretofore often have been uneconomical to process.

The invention, in a preferred form, includes, among other features, immersing crushed ore in a bath of hot solvent, preferably perchlorethylene, at a temperature adequate to melt the sulphur and at which temperature the solvent has a high solvent capacity for the sulphur. If the ore contains moisture the sulphur is melted preferably under pressure, if free of moisture it may be melted at atmospheric pressure. The miscella, that is solvent containing the dissolved sulphur, along with fines, is withdrawn from the bath and mixed with water having a slightly lower temperature, wetting the fines to reduce their effective specific gravity, and at the same time, if desired, effecting precipitation of some of the sulphur as very fine crystals. The wetted fines are thereafter gravity separated from the solvent and sulphur. The miscella of sulphur and solvent is then further cooled to precipitate substantially all of the sulphur in larger crystal sizes, after which the enlarged crystals are separated mechanically from the solvent. The solvent from which the sulphur crystals has been mechanically separated may still contain some sulphur, but as this solvent is reheated and re-used for extraction of sulphur from fresh quantities of ore its sulphur content is not lost. The residual solvent in the separated sulphur crystals is recovered therefrom by distillation under conditions which melt the sulphur. The thus melted sulphur is removed to storage for solidification, and the distilled solvent is returned for re-use in the further extraction of sulphur from ores.

The invention may be practiced conveniently and economically in apparatus as shown in the accompanying drawings. It should be understood, however, that variations in the steps of the method, as well as in the apparatus, may be employed within the scope of the invention.

In the drawings:

Figure 1 is a schematic view and flow diagram disclosing a preferred form of process and apparatus employed in practicing the invention.

Figure 2 is a sectional view on line 2—2 of Figure 1.

Figure 3 is a sectional view on line 3—3 of Figure 1.

Figure 4 is a side elevation of the parts shown in Figure 2.

Figure 5 is a flow diagram showing a modification of a portion of the process illustrated in Figure 1.

Figure 6 is a flow diagram showing another modification of a portion of the process illustrated in Figure 1.

Figure 7 is a schematic disclosure of additional apparatus employed in the event that the sulphur-bearing ore has a small hydrocarbon content, as sometimes occurs.

In the ensuing specification reference will frequently be made for convenience to perchlorethylene as the solvent, but it should be understood that other solvents, if suitable, may be employed.

Referring now to the drawings, the sulphur-bearing ore preliminarily is crushed to small particle sizes, such as about ½ or ¼ inch for example, and may be dehydrated, partially or wholly, if desired, before being introduced into this process. These preliminary steps are to be accomplished by apparatus not shown herein and not forming a part of the invention.

The crushed ore, usually containing some moisture, is introduced into hopper 11 and engaged by a motor driven vertical screw 12 which compacts it against a spring loaded gate 13, forcing the compacted ore past the gate, which yields against the pressure of spring 14, thus dropping the ore into the extractor generally indicated as 15. The compacting of the ore in this manner minimizes or prevents loss of pressure and loss of solvent vapors from the extractor at this ore inlet.

The sulphur extractor is an elongated chamber, which may be cylindrical, if desired, and which should be generally sealed from the atmosphere to avoid solvent vapor losses. Its floor preferably is slightly inclined as shown to drain toward the end at which the ore is introduced. It is provided with a steam jacket to which a suitable heating medium such as steam is supplied by conventional regulating means at such a pressure preferably as to maintain a temperature inside the extractor well above the melting point of the sulphur (which is approximately 235° F.) but lower than the boiling point of the solvent at the existing pressure. The boiling point of perchlorethylene at atmospheric pressure is about 250° F. Ordinarily, as there will be some water present in the ore, the internal chamber pressure will correspond to the azeotrope vapor pressure at the existing temperature. Perchlorethylene and water have an azeotrope boiling point of approximately 190° F. at atmospheric pressure.

If the nature of the sulphur-bearing material is such that the sulphur efficiently may be dissolved therefrom into the solvent below the melting point of sulphur, then such procedure may be adopted to economize on the use of heat, if desired. But in many or most commercial operations it will be advisable to melt the sulphur, as hereinafter described.

The sulphur contained in the ore will be melted in the extractor and dissolves readily into the solvent, inasmuch as perchlorethylene at the temperature here maintained has a high solvent capacity for the sulphur. The sulphur content of the ore particles is progressively decreased by solvent extraction as the ore is advanced progressively and countercurrently through the successive solvent baths in the chamber in each of which baths it is submerged. In the extractor the volume of solvent should greatly exceed the volume of the ore to insure thorough extraction, and this may be done economically as the solvent is repeatedly re-used and none of it need be wasted. For example, the ratio of solvent to ore may be as much as 10 to 1 when the ore contains as much as 30% sulphur.

The ore conveyor apparatus in the extractor may be constructed and operated as follows. A plurality of vertical baffles such as 16 are spaced and proportioned to segregate the solvent into a plurality of baths and to allow the solvent to cascade over the baffles progressively from the higher toward the lower end of the extractor. A shaft 17 extends through the extractor and is rotated slowly by a motor, not shown. A sectional ribbon flight conveyor of conventional character is mounted on the shaft, in sections such as 18, and advances the ore to a point near each baffle where sets of paddles, such as 19 (see Fig. 2) also fixed on the conveyor shaft, pick up the ore and lift it above the top of the adjoining baffle, over which it drops as the paddles engage kicker buttons such as 20 attached to the top of each baffle, extending slightly into the path of travel of the paddles. The buttons flex the paddles and thereby give the paddle blades a slight temporary vibration sufficient to cause the ore to slide off the paddles over the top of the baffle into the next solvent bath. There the ribbon conveyor will pick it up and advance it toward the next baffle, the ore thus moving countercurrently to the solvent flow.

Each of the baffles 16 has its top edge stepped as shown in Fig. 2 with the portion 21 adjoining the rising end of the paddles somewhat higher than the portion 22. The ore is dropped over the higher edge 21 by the ascending paddles while the solvent cascades to the next lower bath over the lower edge 22. Thus, the cascading stream does not flow through the ore falling over the dam.

Adjoining the ore outlet end of the extractor is a dam 23 somewhat higher than the others, over which the paddles 19 lift the ore for eventual discharge. In the chamber between dam 23 and the end wall of the extractor another set of paddles 24 (Fig. 3) fixed on shaft 17 lift the ore into the inclined chute 25 (Fig. 3) which delivers it to the compacting screw 26. The screw, driven by motor 27, compacts the ore and forces it past the spring loaded gate 28 into hopper 29, from which it drops into the tails dryer 30. The plug of compacted tails emerging past the gate 28 blocks the escape of vapor at this point from the extractor.

The tails dryer is an inclined closed steam jacketed chamber which also may be of cylindrical shape, whose internal pressure is maintained slightly below atmospheric pressure, and having a shaft 31 extending therethrough on which is mounted a slowly rotating ribbon flight conveyor 32 for advancing the ore, now substantially free of sulphur, to the outlet chute 33 for engagement by the discharge screw 34, mounted in the tube 35, and driven by the motor 36. This screw compacts the ore against the spring loaded gate 37 forcing it past the gate against the yielding action of the spring 38, dropping the ore into the discharge hopper 39, from which it may be conveyed to waste. This tails discharge mechanism thus helps to prevent excessive vapor loss or the entrance of air at the outlet gate.

One of the functions of the tails dryer is to extract from the sulphur-free ore the residual solvent clinging to the ore particles. There may be some water also adhering to the ore particles, but further water is intentionally added in the tails dryer as explained hereinafter, as a result of which all of the solvent, perchlorethylene, for example, is evaporated with part of the water as an azeotrope vapor, whose boiling point at atmospheric pressure is about 190° F. The azeotrope vapor, being heavier than air or water vapor gravitates to and is withdrawn from the lower end of the dryer through the dome 40 and line 41 to a condenser 42, the operation of which will later be described.

The heat supplied by the steam jacket or the drier 30, together with the residual heat carried by the ore entering the drier, should be sufficient to evaporate enough water in the drier to supply somewhat more than the theoretical proportions of water vapor required to form the azeotrope vapor, this function serving as the means for efficiently recovering all the solvent from the tails. The inclination of the drier and the diameter thereof should be so proportioned that as the heavier azeotrope vapor stratifies and sinks to the lower end of the drier the uppermost layer of this vapor will not be high enough to overflow into the outlet 33. The space in the drier between the top of the zone of azeotrope vapors and the outlet 33 should be great enough to allow for vaporization of water from the tails above and beyond the azeotrope vapor zone. Hence, a zone of water vapor, lighter than the azeotrope vapor, will accumulate in the highest end of the drier adjacent the outlet 33, thus blocking the escape of solvent vapor or azeotrope vapor from the upper end of the drier.

Referring now to the extractor, a pressure relief valve 41' permits the release of non-condensibles from the extractor along with some azeotrope vapor into line 41, yet maintaining the desired pressure in the extractor.

Referring further to the sulphur extractor 15, the hot liquid solvent, containing the sulphur in solution therein and accompanied by fines, overflows the lowermost baffle 43, after passing under a scum baffle 43', if desired, and which may be interposed as shown. The miscella is withdrawn from the extractor through pipe 44 and pump 45 at a temperature of about 240° F. or higher, that is safely above the melting point of the sulphur. This hot miscella then flows through an insulated or heated pipe 46 through check valve 47 into the heat insulated fines wetter 48, in which it is thoroughly mixed with water having a temperature within a range of about 160° to 220° F. delivered thereto by pipe 49 and pump 40 from the water take-off pipe 51. Pipe 46, as well as other pipes carrying hot miscella, should be externally or internally heated to prevent such cooling of the miscella as would induce substantial crystal growth of the sulphur.

The hot solvent emerging from the extractor carries with it a considerable quantity of ore fines, each particle of which becomes wetted by a film of water in the fines wetter, thereby diminishing the total specific gravity of each wetted particle to less than the specific gravity of the miscella of solvent and the molten sulphur. Whereas most or all of the fines originally have a specific gravity exceeding that of the solvent, when they are wetted by the water, which itself is lighter than the solvent, the wetted particles become lighter than the miscella. The sulphur crystals, if they develop at this time, are not wetted by the water.

Hence, when the miscella is delivered through steam jacketed or heated pipe 52 into the insulated fines separator 53 the solvent, which itself has a specific gravity of about 1.6, if it be perchlorethylene, and sulphur contained therein settle toward the bottom of the separator, while the water rises toward the liquid level indicated by line 54 adjacent trough 55. The wetted fines, which are heavier than pure or fines-free water, accumulate along the interface between the water and the miscella and rise through the pipe 56 into the trough 55 from which the wetted fines, intermingled with some free water, are withdrawn by means of pipe 57 and delivered to the tails drier through a pressure relief float controlled valve 58. A pressure equalizer pipe connects, as shown, the inlet chamber of this valve to the pressure equalizer pipe system 59. The fines separator 53 preferably is located at a level higher than the wash tower (later described) in order to afford gravity flow of the miscella to the wash tower.

The water added to the miscella in the fines wetter 48, as explained above, will be in sufficient quantity to insure wetting of all of the fines, and its volume and temperature will be so proportioned relatively to the heat units in the miscella as not to so lower the miscella temperature enough to cause the precipitation of large crystals, as at this time large crystals are not only not desired, but their rapid formation, if it were allowed to occur, might entrap some of the fines. Fines carried by the sulphur crystals would constitute an objectionable impurity if found in the final product. Such fines could not easily or economically be removed from the sulphur merely by remelting of the sulphur and filtering.

The solvent carrying the sulphur is continuously withdrawn from the bottom of the fines separator 53 through an insulated or heated pipe 60 into an overflow tank 61, the top of which is connected, as shown, to the pressure equalizer pipe system 59. The liquid level established by pipe 60 enables the wetted fines to overflow into trough 55. A horizontal plate 62, mounted in any suitable manner just below the end of pipe 56, prevents eddy currents from entraining miscella with the fines.

The miscella flows from tank 61 through pipe 63, which may be insulated or heated, into a vertical wash tower 64 at a temperature around 200° F. and downwardly past the deflector baffle 65 and through perforated plates or screens such as 66, for more uniform distribution. In the wash tower the hot miscella of sulphur and solvent descend countercurrently through an upwardly flowing cooled stream of pure water introduced thereinto from the fines separator through pipes 67 and 67' and cooled in heat exchangers 68 and 68', by any suitable coolants, to about 70° F., preferably, or at least to such a low temperature as will sufficiently chill the contents of the lower part of the wash tower to cause precipitation of substantially all of the sulphur. The water, having a lower specific gravity than the miscella, rises through the wash tower, and, gaining heat by contact with the sulphur and solvent miscella, is continuously withdrawn through overflow pipe 51 for mixture with fresh miscella in the fines wetter.

Preferably, the coolant employed in heat exchanger 68 will be cool solvent, as later explained.

One of the advantages of the step of directly mixing the sulphur and solvent miscella with relatively cool water in the wash tower 64 resides in the fact that as the crystals of sulphur grow they have no tendency to cling to and to grow on the inner surface of the wash tower, as would happen if a cooling jacket on the wash tower were employed for cooling the miscella.

The cooled solvent and large sulphur crystals are continuously withdrawn from the bottom of the wash tower by pipe 69 into an overflow tank 70, the top of which is connected to the pressure equalizer pipe system 59.

Due to the fact that the miscella and water entering the fines separator 53 are at a temperature above the azeotrope boiling point, the system to which the pressure equalizer lines are connected should be maintained under pressure to prevent unnecessary evolution of azeotrope vapor.

The pipes 71 and 72, having interposed therein a float controlled pressure relief valve 73 continuously deliver a stream of solvent and sulphur crystals preferably at about 70° F. into the sulphur classifier 74, which operates at slightly below atmospheric pressure, and in which the solvent drains from the sulphur crystals as the latter are advanced upwardly through the inclined sulphur classifier by means of the ribbon flight conveyor 74'. The pressure equalizer pipe system 59 is connected to the inlet chamber of valve 73 as shown.

The solvent, drained from the crystals, flows over baffle 75, through pipe 75', through heat exchangers 68 and 76 to be heated to just under 250° F. or thereabouts, and is then delivered by a positive displacement pump 77 through line 78 into the sulphur extractor against the pressure existing therein. This reheated solvent ordinarily may contain a very small percentage of sulphur, but this sulphur is, of course, added to the dissolved sulphur being withdrawn from the extractor by the pump 45, hence is eventually recovered.

As the water entering heat exchanger 68 may well have a temperature of about 200–228° F. and the solvent a temperature of about 70° F., the water may be readily cooled to about 10° above the entering solvent temperature. As it is desired to cool this water to about 70° F. to facilitate rapid and thorough precipitation of sulphur crystals the heat exchanger 68' may be supplied with a coolant such as cold water for example at a temperature substantially below 70° F. The solvent passing through heat exchanger 68 gains considerable heat which it previously surrendered in the wash tower, and further heat may be added to it in heat exchanger 76 by a heating medium such as steam or superheated solvent vapors derived from a still 80 and vapor line 84, later described.

If the superheated still vapor be employed it would partially condense in heat exchanger 76 and the condensate would be collected and re-used in the process, as will later be more fully understood.

By simple calculation and regulation of the temperatures and volumes of solvent and water an efficient utilization of heat units can be attained with attendant economy, in the matter of transfer of heat units from water to solvent in the heat exchanger 68, from solvent to water in 48 and 64.

The sulphur crystals which are advanced by the screw conveyor 74', fall through the tube 79 into the steam jacketed solvent still 80 equipped with a live steam coil 81 and a steam condensate trap 82. The sulphur is heated to well above its melting point, for example, to near 300° F., and all the residual solvent therein is distilled off in conjunction with any occluded water. The solvent-water azeotrope vapor boiling off at 190° F. and solvent vapors at 250° F. are both withdrawn through dome 83 and pipe line 84 for delivery to the water cooled condenser 42. The solvent still is provided with a series of cascade type baffles, such as 85 over which the melted sulphur cascades as it advances toward the steam jacketed sulphur outlet trap 86. From this trap the sulphur may be withdrawn and solidified for use, if desired. The sulphur is thus completely freed of residual solvent as it passes through the still, and as will now or later be recognized, this process may be operated without any substantial solvent loss.

Referring next to the condenser 42 and associated apparatus, this condenser, which may be cooled by water or other appropriate coolant, receives azeotrope vapors and solvent vapors and condenses them, delivering the condensates through pipe 87 into a gravity separator 88 wherein, due to the fact that the solvent has a specific gravity of 1.6, the water and solvent readily become gravity separated. The water rises at one side of the central vertical baffle 88' and continuously overflows through the pipe 89 into a water storage tank 90 from which it may be withdrawn through pipe 91 and positive displacement pump 92 to pipe 67 for re-use in the wash tower 64. When needed, make-up water may be added to tank 90 from any suitable source.

The pure solvent continuously overflows through pipe 93 through closed tank 94 having a float-controlled outlet valve 95, and is injected by positive displacement pump 96 into the upper end of the sulphur extractor 15.

As some uncondensed vapors and non-condensible gases enter the gravity separator 88 from the condenser 42 the gravity separator is constantly subjected to suction through pipe 97, check valve 98, pipe 99, by means of an exhaust fan 100 connected by pipes 101 and 102 to a carbon adsorber 103 into or through which these gases are continuously drawn. In the carbon adsorber any solvent present in these vapors is adsorbed and the non-condensibles pass through and are discharged by the exhaust fan to atmosphere. When the adsorber becomes saturated, or at predetermined or desired intervals, the three-way valve 104 may be operated to cut off suction exerted by the fan 100 and live steam is admitted through pipe 105 and caused to flow downwardly through the carbon adsorber, stripping the solvent therefrom as an azeotrope vapor and forcing it through the check valve 106 and pipe line 107 into the condenser 42 which will condense the azeotrope vapor and deliver the solvent and water to the separator 88. After the stripping operation is completed, valve 104 may be reversed and the usual function of the exhaust fan 100 is resumed.

The pressure on tank 94 is equalized by means of pipes 108 and 109 connected, as shown, to the condenser 42. Pipe 110 connected to the lower end of the classifier 74 serves to conduct to the condenser such azeotrope vapors and solvent vapors as may be flashed into the classifier as the solvent and sulphur miscella enter through the pressure reduction valve 73.

In résumé, the process as illustrated in Figs. 1 to 4 inclusive, is operated as follows. The crushed sulphur-bearing ore is fed into the sulphur extractor 15 into a hot solvent bath therein which serves to dissolve the sulphur. The extractor is maintained under pressure sufficiently high that the water-solvent azeotrope vapor, which otherwise would boil off at 190° F. if the pressure were atmospheric, will not boil off at or below the melting point of the sulphur. The sulphur free ore is continuously delivered to the tails drier 30, which is maintained at slightly below atmospheric pressure and residual solvent is vaporized therefrom in the drier as an azeotrope vapor and recovered through the condenser for re-use. The hot solvent, containing dissolved molten sulphur, is passed through the fines wetter 48 into the fines separator 53 wherein the wetted fines gravitationally separate from the miscella, as explained heretofore. The sulphur is delivered with the solvent to a wash tower 64 where the sulphur is further chilled, causing crystal seeds to grow into larger sulphur crystals.

The solvent and sulphur crystals are then passed into the sulphur classifier 74, from which the solvent is drained and returned to the extractor. The sulphur is forwarded to a solvent still 80 and remelted, while the residual solvent is being distilled therefrom. All solvent derived from the tails drier and solvent still is condensed and returned to the process. Likewise, all the water or substantially all of the water employed in the process is retained therein in a closed cycle, excepting for the water carried out with the ore from the tails drier.

The modification disclosed in Fig. 5 may be employed when the process is being operated where there is available at low cost for use in the process an ample supply of cold water having a temperature well below 70° F. and where its use in the manner about to be described would be more economical than the manner of use of the water as circulated in accordance with Fig. 1. In such case a wash tower 151, similar in construction and purpose to the wash tower 64 is employed, but for chilling the miscella of solvent and sulphur to about 70° F. at the bottom of the wash tower the line 152 will continuously introduce fresh cold water from such supply source into the lower portion of the wash tower. The pump 153 will continuously withdraw heated water through overflow pipe 154 from the upper portion of the wash tower and will pump it through the fines wetter 155 for admixture with miscella delivered thereto by pipe 156 from a sulphur extractor operating as does the extractor 15 of Fig. 1.

The rate of water flow through wash tower 151 will be regulated by conventional means, not shown, to cause the water entering the fines wetter to serve the same purpose as the water flowing through the fines wetter of Fig. 1.

However, as a difference from the process outlined in Fig. 1, no attempt is here made to establish a layer of wetted fines between the water and miscella interface. Rather, all the water and wetted fines rising above the miscella will be withdrawn together from the neck of separator 158 through pipe 159 and directed into a flash chamber 159' wherein the azeotrope vapors, if any, are flashed off and delivered to the condenser 42 by conventional pipe connections (not shown). As much of the separated water (containing fines) as is needed to form the required amount of azeotrope vapor in the tails drier may be delivered to a tails drier such as 30 connected to the sulphur extractor 15.

The miscella of solvent and sulphur would be withdrawn from separator 158 by pipe 160, through an overflow tank 161 and pipe 162 for further chilling and crystal growth in the wash tower 151. As in the process of Fig. 1, the cooled miscella would be evacuated from the bottom of the wash tower by pipe 163, for delivery into a pipe such as 69 and the overflow tank 70 of Fig. 1 for treatment thereafter as will be understood by reference to Fig. 1.

A further modification of the invention shown in Fig. 6 requires the use of most of the apparatus of Fig. 1 but involves the elimination of the wash tower as a means for a second stage of chilling the miscella to induce precipitation of all of the sulphur in larger sulphur crystals. The same fines wetter and fines separator as are shown in Fig. 1 will be employed but in this instance the water withdrawn from above the layer of wetted fines at the interface between the miscella and water will be recirculated from the separator 170 by pipe 171 and pump 172 through the fines wetter 173 back to the separator. Cooling water and make up water may be added as needed through pipe 174, if desired, to effect the same first stage partial cooling of the miscella as is described in connection with Fig. 1. As will be understood from the description of Fig. 1, the wetted fines, together with any water which the operator may not desire to recirculate through pipe 171 and the fines wetter may be withdrawn from the fines separator by pipes 175 and 175' for delivery to the tails drier.

The miscella, containing solvent and fine sulphur crystals, may be withdrawn from the bottom of fines separator 170 by pipe 176 into the overflow tank 177 and from that tank be conducted by pipe 178 and through a float controlled pressure reduction valve 178' into the vacuum pan 179, entering at about 200° F. A stream of cool water will be continuously introduced into the pan by pipe 180 upon the surface of the miscella, if desired, or in any desired manner under control of valve 181 or other suitable control.

In the vacuum pan, above the liquid level therein, a tray 182 will be supported in any suitable manner and disposed therein will be a cooling coil 183 through which a coolant such as cold water may be circulated. Under the temperatures and subatmospheric pressure conditions prevailing in the vacuum pan solvent will be evaporated rapidly from the miscella, forming with the water an azeotrope vapor whose boiling point at the existing pressure will be considerably higher than the temperature of the cooling coil 183. The azeotrope vapors will rise and be deflected as indicated into the tray 182 into contact with coil 183. Hence, this azeotrope vapor will condense rapidly on the coil and the condensate will collect in tray 182 and be evacuated by pipe 184, positive displacement pump 185 and pipe 186 to a gravity separator 187 which will have associated with it a condenser and carbon adsorber (not shown) functioning in the same manner as the similar units shown in Fig. 1. The separated water and solvent may then be re-used in the process.

The condensation of the azeotrope vapor will aid in the matter of inducing vacuum in the pan. A hood 188 will be connected in series with one or more carbon adsorbers 189 and a vacuum pump 190, delivering vapors and gases free of solvent to atmosphere. The functioning of the carbon adsorber and the stripping thereof by means not necessary to duplicate here will be understood by recalling the description of the process of Fig. 1.

In the vacuum pan 179 the miscella may readily be chilled to about 80° F., which chilling will induce a growth of larger sulphur crystals, which may be evacuated with the solvent through pipe 192 and positive displacement pump 193 for delivery into a sulphur classifier 194. The latter will be connected to a solvent still 195, the functioning of which classifier and still may be understood by reference to Fig. 1.

A pressure equalizer pipe system 191 will be connected as shown to equalize the pressures in units 170, 177 and 178'.

In view of the fact that some of the sulphur containing ores intended to be processed by this invention may contain hydrocarbons, provision should be made for the extraction of such hydrocarbons in a manner which will not interfere with the heretofore described sulphur extraction processes and to enable the production of sulphur free from such hydrocarbons. If the hydrocarbon content of such ores is much over a percentage such as 10% it probably would be more economical to extract such hydrocarbons with solvent at a temperature well below the melting point of the sulphur, before such ore is introduced into the process above described. But should the hydrocarbon content be less than 10%, I have shown in Fig. 7 a practical means for disposing of it.

As shown in Fig. 7, to the pipe 72 of Fig. 1, carrying the miscella en route to the sulphur classifier, there would be connected a pipe 201 leading to a metering pump 202 which would be regulated to divert enough miscella from the process of Fig. 1 to maintain the hydrocarbon content in solution in the sulphur classifier and extractor below a desired constant low level. The pump 202 would deliver a portion of the miscella to the cooler 203, which preferably would be cooled by a refrigerant coolant so that the miscella flowing into the pipe 204 would be at about 40° F. or lower. The miscella would drop into an auxiliary sulphur classifier 205, which would separate and discharge sulphur crystals free of hydrocarbons through outlet pipe 206, to a solvent still, such as 80 of Fig. 1, wherein the sulphur would be melted and the adhering solvent distilled therefrom and recovered. The bulk of the solvent and the hydrocarbons dissolved therein would be delivered by pipe 207 into a heavily insulated stripping still 208, provided with a steam coil 209. In this still the solvent would be evaporated from the hydrocarbon evacuated by pipe 210 and after being condensed would be returned to the extractor. The hydrocarbon residue would be delivered through a trap 211 to a hydrocarbon storage tank. Such hydrocarbon, thus recovered, would, of course, be a valuable by-product.

The hydrocarbons remain dissolved in the solvent while in the classifier 205, which would be true also of the solvent present in the main classifier 74. In each classifier, therefore, the sulphur is mechanically separated free of hydrocarbons. While the solvent drained from classifier 74 will contain and thus recirculate the hydrocarbons, a build up of these hydrocarbons in the recirculating solvent is prevented by continuously diverting and extracting in the apparatus of Fig. 7, at least as much hydrocarbon as is continuously entering the system with the fresh ore.

Should the hydrocarbon content of the sulphur ore be high enough I may choose to divert all of the miscella delivered by pipes 71 and 72 into the apparatus of Fig. 7 and treat it as just above described to separately recover the sulphur, the solvent, and the hydrocarbon.

It will now be perceived that the principles of the invention are readily adaptable to the solvent extraction of sulphur from various free sulphur ores and under varying conditions. If the process be operated as described above economical yields of high purity sulphur, in excess of 99.5% purity, are readily obtainable.

As stated previously, solvents other than perchlorethylene may be used, if suitable to the requirements of this invention. Such a solvent should have a high solvent capacity for sulphur near or above the sulphur melting point. Its boiling point at or near atmospheric pressure or under moderate pressures should be above the temperature at which it is required to dissolve the sulphur, yet its boiling point should not be so high as to make it uneconomical to vaporize it off from the sulphur in apparatus such as still 80 or vacuum pan 179.

In view of the fact that sulphur bearing ores may frequently have a moisture content which need not or perhaps cannot economically be removed before extraction of sulphur therefrom and that the temperature in the extractor and in the miscella after removal therefrom may be above the azeotrope boiling point, it is well to employ a solvent whose water-solvent azeotrope vapor pressure at these locations in the process will not be too high for practical and economical operating conditions, as it is desired to maintain at such locations a pressure which will prevent substantial evolution of azeotrope vapor.

In addition to these considerations, the solvent in the presence of the other materials should not promote corrosion problems or other hazardous conditions rendering its selection undesirable.

Such other solvents in the class of halogenated hydrocarbons may include tetrachlorethane and perhaps some of the fluorinated hydrocarbons whenever these various halogenated hydrocarbons become available in commercial quantities at practical prices and free of contaminants such as might hinder their use in this invention.

It should be understood that conventional controlling and regulating equipment well known in the art, whether or not shown herein, may be employed as desired, and that various details of the process and apparatus may be modified without departing from the principles of the invention defined by the claims hereof.

Having shown and described my invention, I claim:

1. In a continuous process for extracting sulphur from ore, the steps including feeding crushed ore into a hot solvent bath and extracting sulphur from the ore into the solvent, progressively moving the ore through said hot solvent for continued extraction of sulphur therefrom and removing from the bath the substantially sulphur free ore, segregating from said bath continuously a hot miscella of solvent, sulphur and ore fines, admixing with said hot miscella sufficient water under vigorous agitation to thoroughly wet the fines and at a temperature and in such proportion as to avoid any substantial precipitation of sulphur in solid form from the miscella, collecting the mixture of water and miscella in a settling space and allowing the solvent-sulphur solution to gravitate to the lowest zone of said space, the wetted fines to collect in a zone above the solvent-sulphur solution and excess fines-free water to collect above the wetted fines zone, continuously withdrawing sulphur and solvent from said lowermost zone, continuously withdrawing wetted fines from the wetted fines zone and the excess water from the zone above the wetted fines zone, lowering the temperature of the withdrawn solvent-sulphur solution further to precipitate substantially all of the sulphur therein in solid form, gravitationally separating precipitated sulphur from the solvent, and recovering final traces of solvent from said separated sulphur by remelting the sulphur and distilling the solvent therefrom.

2. In a continuous process for extracting sulphur from ore, the steps including mixing crushed ore with a solvent bath having an atmospheric boiling point and its maintained temperature both above the sulphur melting point, continuously removing from the bath a miscella of hot solvent, molten sulphur and ore fines, wetting the fines in said hot miscella by vigorous agitation with water and gravitationally separating and withdrawing them from the solvent and sulphur, maintaining the sulphur in said miscella at such an elevated temperature as to prevent precipitation of large sulphur bodies until the fines have been water-wetted and gravitationally separated therefrom, cooling the fines-free solvent and sulphur for precipitating the bulk of the sulphur in solid form, and separating the solidified sulphur from said solvent.

3. In a continuous process for solvent extracting sulphur from ore, the steps including solvent extracting sulphur from the ore at a temperature above the sulphur melting point, separating from the residual ore the sulphur bearing solvent solution together with ore fines suspended therein, water wetting the ore fines in said separated solution with water under violent agitation at an elevated temperature high enough to avoid substantial precipitation of large sulphur bodies, separating fines-free sulphur and solvent from the wetted fines and water, cooling the sulphur and solvent sufficiently to precipitate the bulk of the sulphur and separating the precipitated sulphur from the solvent, recovering solvent traces from the separated sulphur by distillation thereof above the sulphur melting point, recovering solvent traces from the ore tailings by distillation of the solvent from said tailings in admixture wtih water as an azeotrope vapor, and reusing the separated and recovered solvent for extraction of further sulphur.

4. In a continuous process for extracting sulphur from ore in which a hot miscella of solvent, dissolved sulphur and entrained ore fines are continuously removed from a solvent extracting chamber, the steps of wetting the fines in said hot miscella by violent agitation with heated water without substantial precipitation of sulphur in solid form, separating the solvent-sulphur solution from the wetted fines and water, precipitating the bulk of the sulphur contained in said hot miscella by directly mixing cool water therewith and withdrawing and utilizing the water heated by said admixture for wetting the fines in subsequently processed sulphur.

5. In a continuous process for extracting sulphur from ore in which a hot miscella of solvent, dissolved sulphur and entrained ore fines are continuously removed from a solvent extraction chamber, the steps of wetting the fines under violet agitation in said miscella with process-heated water without such cooling of the miscella as to effect substantial precipitation of sulphur in solid form, separating the solvent-sulphur solution from the wetted fines and water, precipitating the bulk of the sulphur contained in said hot miscella by directly mixing cool water therewith and utilizing the water heated by said admixture as the aforesaid process-heated water for wetting the fines in subsequently processed sulphur, separating the precipitated sulphur from said cooled solvent, utilizing said cooled solvent for cooling water employed during the wetting of said fines, and utilizing the solvent after heat exchange with said water for introduction into the solvent extraction steps of the process.

6. In the solvent extraction of sulphur from ore, the steps including solvent extracting sulphur from the ore in a solvent bath maintained under pressure at a temperature above the solvent-azeotrope boiling point, withdrawing from the bath a miscella of hot solvent, dissolved sulphur and accompanying ore fines at a temperature above the sulphur melting point, subsequently wetting the fines by directly and violently mixing with the miscella a quantity of heated water in excess of that which adheres to the wetted fines and at a temperature high enough to avoid substantial sulphur precipitation, gravitationally separating and withdrawing the solvent and sulphur from the wetted fines and excess water, cooling the separated solvent-sulphur solution by direct admixture therewith of cool water adequate to precipitate the bulk of the sulphur present, while maintaining the hot miscella during the water wetting, separating and precipitating steps sealed from the atmosphere, thereby preventing loss of solvent-azeotrope vapors.

7. In a continuous process for the extracting of sulphur from ores in which a hot miscella of solvent, dissolved sulphur and entrained water-free ore particles from which sulphur has been extracted are continuously withdrawn from a solvent extraction chamber, the steps of wetting the ore particles in said miscella after withdrawal of the miscella from the extraction chamber with heated water at such temperature and such proportion to the miscella as to avoid such cooling of the miscella as to effect substantial precipitation of sulphur in solid form, separating the solvent-sulphur solution from the wetted ore and water by settling action, precipitating the bulk of the sulphur from the separated solution by directly mixing cool water therewith, separating the precipitated sulphur from said cooled solvent, and utilizing the separated solvent for introduction into the solvent extraction steps of the process.

8. In a continuous process for the extracting of sulphur from ores in which a hot miscella of solvent, dissolved sulphur and entrained water-free ore particles from which sulphur has been extracted are continuously withdrawn from a solvent extraction chamber, the steps of wetting the ore particles in said miscella under superatmospheric pressure after withdrawal of the miscella from the extraction chamber with heated water at such temperature and such proportion to the miscella as to avoid such cooling of the miscella as to effect substantial precipitation of sulphur in solid form, separating the solvent-sulphur solution from the wetted ore and water by settling action, precipitating the bulk of the sulphur from the separated solution by directly mixing cool water therewith, separating the precipitated sulphur from said cooled solvent, and utilizing the separated solvent for introduction into the solvent extraction steps of the process.

9. In the continuous solvent extraction of sulphur from ore, the steps include solvent extracting sulphur from the ore in a heated solvent bath without water-wetting of the ore prior to solvent extraction, withdrawing from the bath a miscella containing hot solvent, dissolved sulphur and water-free ore particles and wetting the ore particles therein by thoroughly contacting hot water therewith at a temperature and in such proportion as to avoid substantial precipitation of sulphur, gravitationally segregating the wetted ore from the remainder of the miscella and withdrawing said remainder, cooling the ore-free miscella of solvent and dissolved sulphur by direct admixture therewith of cool water thereby precipitating the sulphur in solid form, separating the solidified sulphur from the bulk of the solvent, and evaporating the residual solvent from said sulphur.

10. In a continuous process for extracting sulphur from ore in which a hot miscella of solvent, dissolved sulphur and entrained water-free ore fines are continuously removed from a solvent extracting chamber, the steps of wetting the fines in said removed hot miscella by thorough agitation with heated water at such temperature and in such proportion as to avoid substantial precipitation of sulphur in solid form, separating the solvent-sulphur solution from the wetted fines and water, and precipitating the bulk of the sulphur contained in said separated hot miscella by directly mixing cool water therewith, and removing residual solvent from the precipitated sulphur by evaporation of the solvent.

References Cited in the file of this patent
UNITED STATES PATENTS

| | | |
|---|---|---|
| 1,497,649 | Marx | June 10, 1924 |
| 1,628,787 | Kennedy | May 17, 1927 |
| 1,963,921 | Nagelvoort | June 19, 1934 |
| 2,088,190 | Du Pont | July 27, 1937 |
| 2,234,269 | McDonald | Mar. 11, 1941 |
| 2,316,673 | McDonald | Apr. 13, 1943 |
| 2,419,310 | Belchetz | Apr. 22, 1947 |
| 2,610,908 | Deprey et al. | Sept. 16, 1952 |